Patented Dec. 27, 1938

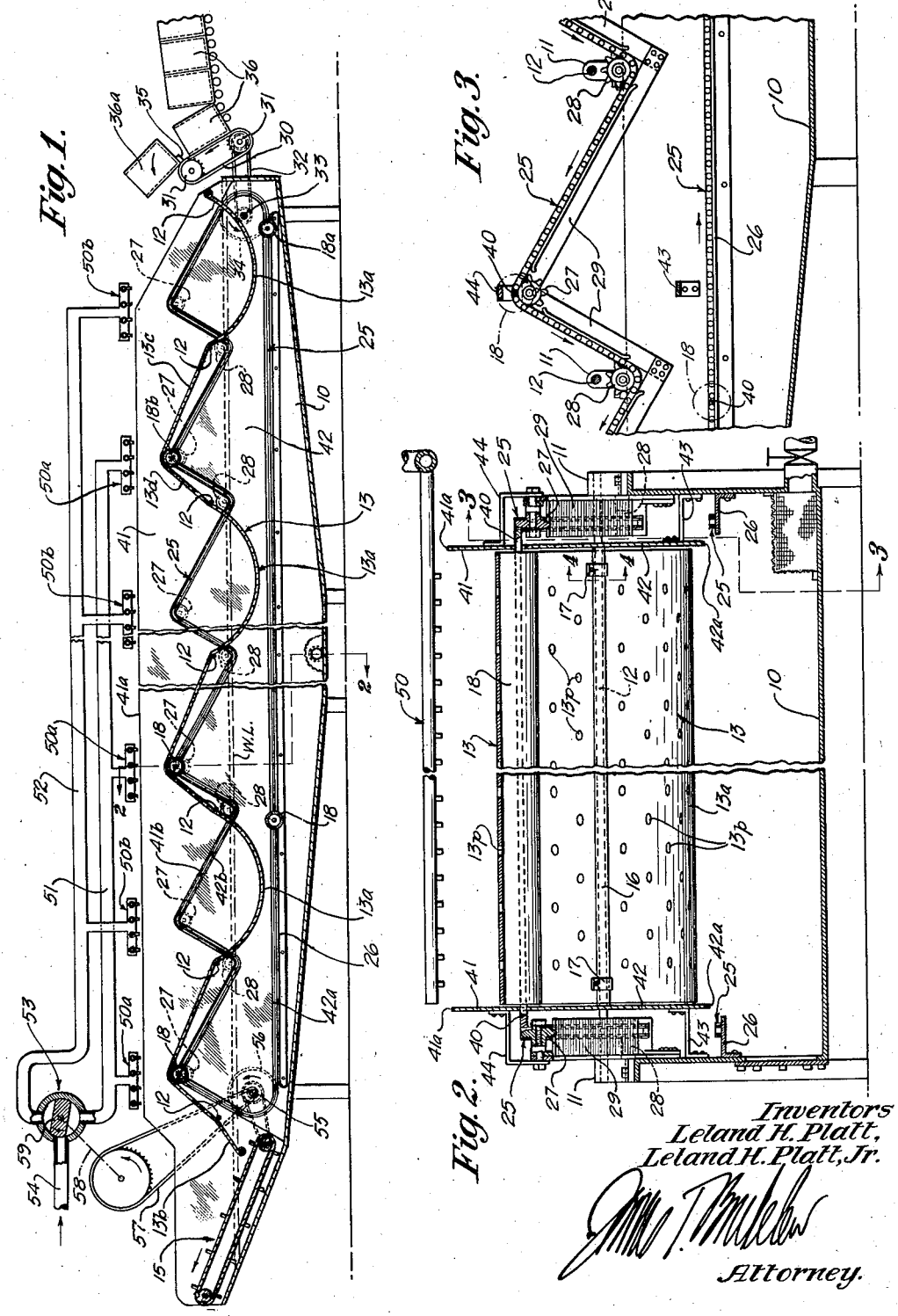

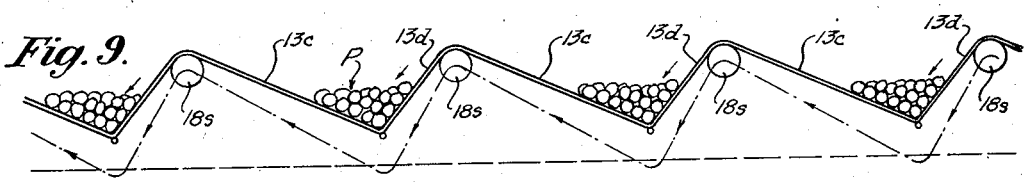
Fig. 9.
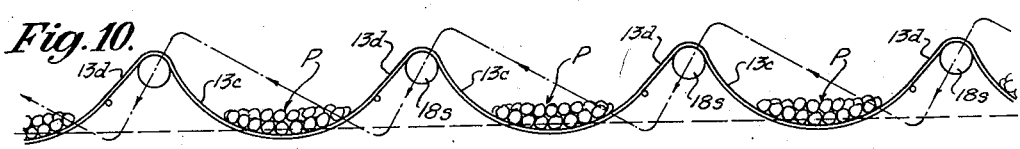
Fig. 10.
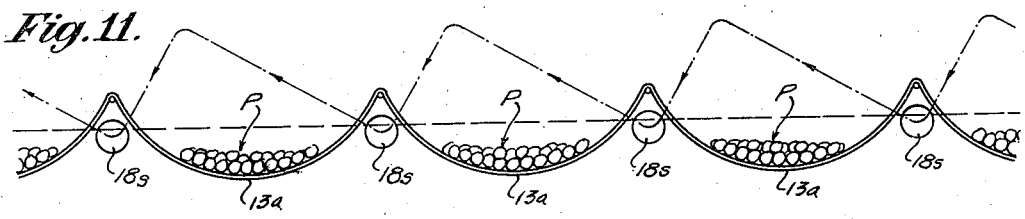
Fig. 11.
Fig. 12.
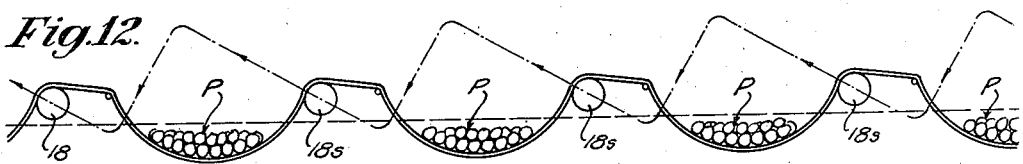
Fig. 13.
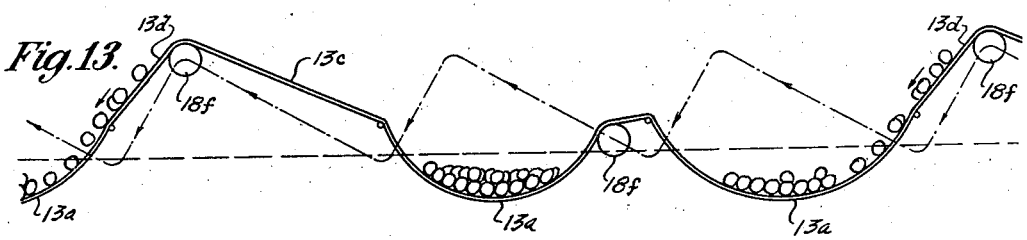
Fig. 14.
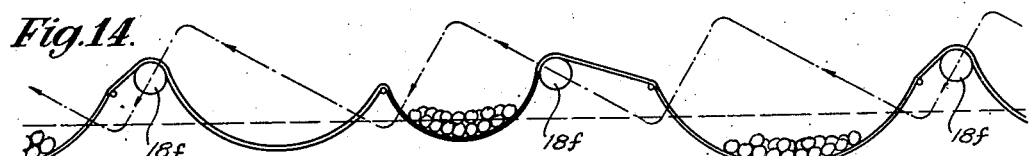
Fig. 15.
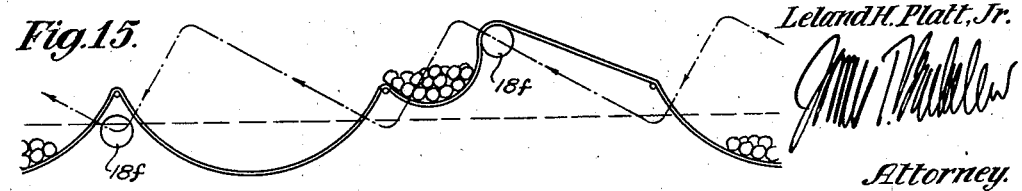

2,141,362

UNITED STATES PATENT OFFICE 2,141,362

WASHER FOR FRUITS, VEGETABLES, AND THE LIKE

Leland H. Platt and Leland H. Platt, Jr., Los Angeles, Calif.

Application March 5, 1937, Serial No. 129,160

2 Claims. (Cl. 146—194)

This invention relates to machines for washing fruits, vegetables and the like; and the general object of this invention is the provision of mechanism of simple and inexpensive character, and capable of efficiently and thoroughly washing such produce.

Some produce, such for instance as carrots, needs thorough washing, soaking and agitation, in order to soften and remove the adhering earth. It is particularly an object of this invention to provide a mechanism, and a system, of washing, that will effectively remove the large quantity of earth that sometimes adheres very closely to such produce. Other objects and corresponding accomplishments of the invention will be best understood from a consideration of the preferred and illustrative forms described in detail in the following specification.

A characteristic of the illustrative form of the invention as here exemplified, is that it provides a movement which, in succession, raises the produce above a water bath, sprays it while it is so raised, and then drops, slides or rolls the produce into the water bath to then soak for a period of time. The machine herein described performs these operations on the produce in successive cycles, so that, in passing through the machine, the produce has been successively raised and sprayed, dropped, and soaked. Such combination or succession of operations removes closely adhering earth much more effectively than a simple washing or a simple spraying, and in general, gives the produce a much more thorough washing.

The mechanism which here exemplifies the invention is equipped with a longitudinally, horizontally extending produce supporting agency or element, which may very conveniently be in the form of a flexible strip of material. Specifically this element will be hereinafter referred to as a flexible belt, although that term is not intended as a limitation upon the invention. That produce supporting element or agency is, at suitable longitudinally spaced points, fixed against any substantial movement; and between such longitudinally spaced points it normally hangs in the form of dips or sags. Specifically and illustratively, the arrangement may be pictured as that of a horizontally extending flexible belt of any suitable material or make-up, supported at longitudinally spaced points, and normally sagging between adjacent points of support. For the purpose of soaking the produce, these sags dip into a liquid bath.

Means are provided for successively raising the belt sags, one after the other, through the length of the belt. When a sag is raised, the produce resting in that sag is raised with it, out of the water bath, and when the sag reaches a sufficient height and slope, the produce falls or rolls down that slope into the next succeeding sag. After a period of soaking in the water bath in that sag, then that sag is raised, to raise and discharge the produce into the next succeeding sag, and so on. A multiplication of the sag raising means provides for keeping a plurality of charges of produce moving down the belt from sag to sag at the same time.

A sprinkling or spraying system above the belt provides for spraying the produce with liquid while it is raised out of the water bath; and, as explained hereinafter, the sprinkling system may be so coordinately timed with relation to the sag raising devices, and so placed, as to spray only in those zones occupied by the produce when raised, and only at times when the produce is so raised.

A more detailed description of a preferred and illustrative form of the invention follows, reference being had to the accompanying drawings, in which:

Fig. 1 is a longitudinal sectional view, more or less diagrammatic, of a preferred and illustrative form of mechanism;

Fig. 2 is an enlarged cross section on line 2—2 of Fig. 1;

Fig. 3 is a fragmentary section taken as indicated by line 3—3 of Fig. 2;

Figure 5:
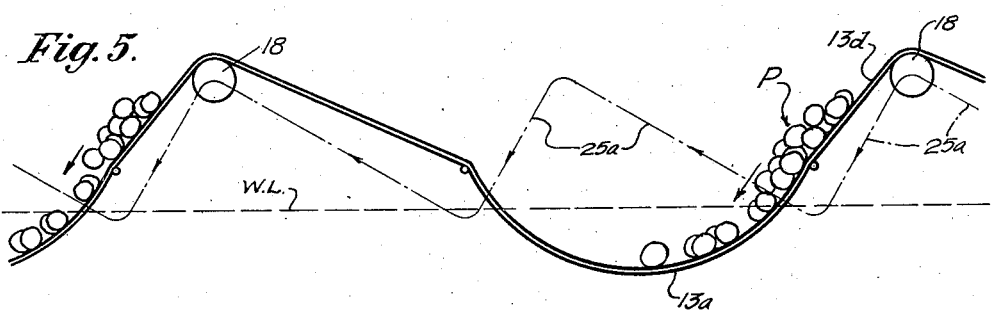
Figs. 5, 6, 7 and 8 are diagrams illustrating the action of the mechanism shown in the preceding figures.

Figs. 9 to 15, inclusive, are similar diagrams illustrating the action of mechanisms in which are utilized different spacings of the sag raising devices; and Figs. 16 to 19, inclusive, are diagrams illustrating a further modification.

We now proceed to a detailed and particular description of the preferred form of mechanism shown in the drawings; but it will be understood that this description is particularized only for the purpose of enabling one specific form of the invention to be understood, and not for the purpose of limiting the invention itself.

In the drawings, the numeral 10 designates an elongated tank or tray adapted to contain the water or other liquid bath and which, in the form as shown, forms a part of the frame work of the mechanism. Extending across the top of this tank, supported on suitable brackets 11 on the edges thereof, is a series of cross rods 12, spaced apart longitudinally, as indicated in Fig. 1. These cross rods form the longitudinally spaced, and relatively fixed supports for the flexible belt 13. The belt hangs, in sags 13a, between these supports 12 when it is not lifted by the raising mechanism. Consequently we refer to the belt as normally sagging between the successive supports. At the discharge end the belt may have an extending apron portion 13b to facilitate final discharge of the produce onto a discharge conveyor 15.

The produce moving down over and off the apron 13b is discharged into the water bath whose level is at W. L. Resting and floating thus in the water over the discharge conveyor 15, the produce is more or less distributed into a uniform layer that is more effectively picked up and carried away by the discharge conveyer.

In order to secure the belt at each one of the supporting cross rods 12 in such a manner as to allow the belt to swivel about the rod, and at the same time to hold the belt substantially against movement at each rod, we mount on each rod a rotatable sleeve of tube 16, and then secure the belt 13 to that sleeve by way of clamps 17.

The form of belt raising means herein particularly shown includes a number of transversely disposed and longitudinally spaced rollers 18. These rollers are actuated or moved in such a manner as to rise under successive sections of the belt and thus to raise successively the sags therein. Although the rollers may take various paths of movement, and may be actuated by various means, for simplicity's sake, we prefer to move and carry them on a pair of endless carrier chains whose path of travel, is of a simple zig-zag sort. Thus, two endless chains 25 are shown, each chain having a return run on a horizontal guide 26 within the tank, and having an upper run over upper and lower idler sprockets 27 and 28 which are supported on framing 29.

The lower sprockets 28 are located substantially in vertical alinements with the belt supporting cross rods 12; but somewhat below the cross rods, so that the roller or rollers 18 carried by the chains will at those points of their travels pass under the cross rods. The upper idler sprockets 27 are located in such a position with reference to the belt and the spaced cross rods 12, that the belt is lifted and held taut on two slopes in such a position as indicated at 13c, 13d in Fig. 1. In this position, the sloping section 13d of the belt stands at such an angle that any produce resting upon it will slide or roll off into the next adjacent dip 13a of the belt.

Referring to the diagrammatic Figures 5 to 8, inclusive, consider first the action of a single belt raising roller 18, the one shown on the right of these figures. The path travelled by roller 18 is indicated by the line designated 25a—the path of travel of the chains 25. In Fig. 5 this roller 18 is shown at the uppermost point of its travel, and the produce P is shown in the course of sliding, dropping or rolling down the sloping belt section 13d into the adjacent belt sag 13a and into the water bath which lies at the level indicated by the line W. L. in these figures. In this uppermost position of roller 18 the belt is preferably held substantially taut, as indicated.

Figure 6:
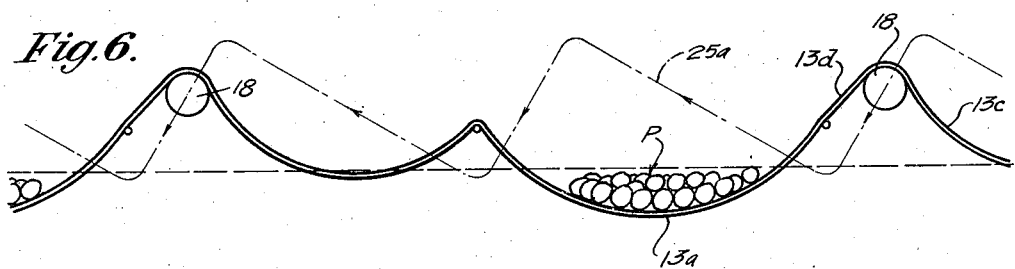
Figure 7:
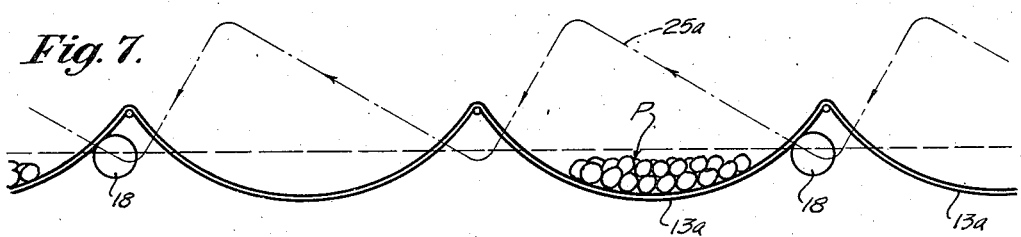
Figure 8:
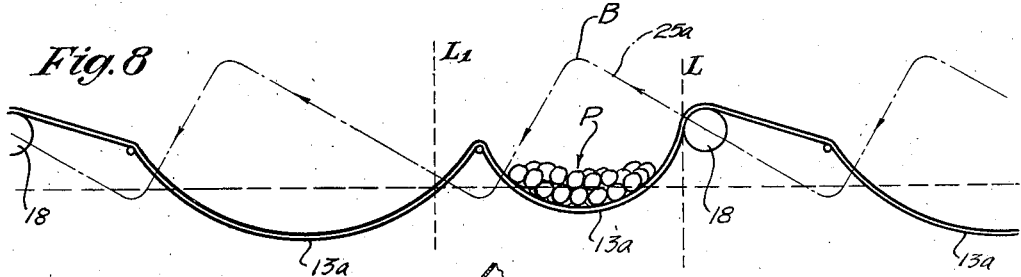

Fig. 6 shows this roller 18 in a position further along to the left in its line of travel, lowering the belt portion 13c toward its sagging position; and shows the produce P resting in the sag 13a in the water bath. The produce rests in that position, soaking in the liquid, while the roller moves on through the position shown in Fig. 7 toward the position shown in Fig. 8. In this position the roller 18 is rising under that belt sag 13a into which the produce was just previously delivered, and is raising the belt sag portion 13a, and the produce with it. Further movement of that roller 18 to its next uppermost position, the position indicated by the letter B, raises the produce still higher and causes it to roll, slide or drop off into the next successive sag 13a, where, after soaking for a period in the bath, it will again be lifted and successively discharge into the next belt sag. Thus, by the action of a single belt raising roller, or equivalent mechanism, acting in succession on the successive sags of the belt, a single charge of produce is moved from sag to sag, being intermittently and successively lifted, sprayed upon (as hereinafter described) and dropped into the successive sags to soak.

Thus, if a charge of produce, is deposited in the first belt sag 13a (the one at the right in Fig. 1) at any time ahead of the arrival of the raising roller at that sag, that charge of produce will be carried through the machine, subjected successively to the actions described, and will finally be delivered from the last sag of the belt onto the delivery conveyor 15. Means for spraying the charges of produce on their way through the mechanism, in timed relation with its action, will be described later.

To increase the washing capacity of the mechanism, to make it carry and act upon a plurality of produce charges simultaneously, a plurality of belt raising rollers is provided upon and carried by the carrier chains 25. Thus, in the figures so far referred to, these rollers 18 are shown spaced along the chains 25 at such distances that the several rollers will simultaneously raise alternate sag portions of the belt, simultaneously delivering batches of produce from the several portions thus simultaneously raised into the several adjacent sag portions which are not at that time being raised. With such an arrangement of mechanism, a charge of produce will be delivered into the first belt sag, (right hand in Fig. 1), just ahead of the time that each roller 18 reaches and begins to raise that sag; or, more preferably, just after any roller has passed that first sag and has allowed it to assume its normal position in the water bath.

For purposes of illustration, we show a feeder mechanism that embodies a belt or chain 30, running over suitable wheels or drums 31, and driven in synchronism with the carrier chains 25, by way of a chain drive 32 driven from the main drive shaft 33 which carries the drive sprockets 34 that drive chains 25. This feeder belt or chain 30 may be provided, for instance, with a lug 35 that, in its upward travel, lifts a produce crate or box 36 in properly timed relation with the belt raising mechanism. The crate or box being thus lifted, as to the position shown at 36a in Fig. 1, an attendant may then easily dump the contents into the first belt sag. The action of the feeder belt 30 and the dumping of a charge of produce, are timed to take place before the roller, specifically designated 18a in Fig. 1, has reached the first or right hand sag 13a, and preferably just after the roller specifically designated 18b in Fig. 1 has left that sag. The feeder mechanism thus acts to feed a batch to the first sag of the belt each time the rollers are approaching the position shown in Fig. 1.

Figs. 5 to 8 show, in diagram, rollers 18 spaced as has been described, and thus show charges of produce in alternate sags of the belt, each charge being moved along by what may be termed its own individual roller.

Although we have found that the roller spacings shown in these figures is a desirable one, they may be otherwise spaced. It of course needs no description or illustration to show that the rollers may be fewer in number and spaced further apart than has been illustrated and described. The result of that is merely that the belt carries a lesser number of produce charges at any one time. Figs. 9 and following, however, show in diagram how the number of belt raising rollers may be increased, and their spacings decreased, with resultant increase of machine capacity. Thus Fig. 9 shows each sag portion of the belt raised by a roller 18s, and shows a charge P of produce in the action of moving off the steep slope 13d of one section onto the relatively longer and less steep slope 13c of the next belt section. By the time the rollers 18s have reached the position shown in Fig. 10, the produce charges P are resting in the then sagging belt sections 13c. During the movement of the rollers from the positions shown in Fig. 9 to the positions shown in Fig. 10, the belt sections 13d, are kept taut by reason of the fact that the sections 13c are both longer and at a lesser inclination than sections 13d. Consequently, as the rollers reach the position shown in Fig. 10, the produce will have rolled, slid or dropped off the belt sections 13d into the then sagging sections 13c. In the next position of the rollers shown in Fig. 11, all sections of the belt are fully sagging, as at 13a, the produce charges P resting in them, and soaking in the water bath. The charges remain in that position until the rollers next begin to move up under the sag sections of the belt and raise the belt and the batches of produce again toward the positions shown in Fig. 9; as indicated in Fig. 12. It will be understood that with this spacing of the rollers, the feeding mechanism will be timed to deliver a batch of produce to the first belt sag (on the right in these figures) each time the rollers reach approximately the position of Fig. 10, when a roller is leaving, or just about to leave, that first belt sag.

Figs. 13 and following, illustrate diagrammatically another spacing of the rollers, there indicated as 18f. The spacing here illustrated is not so short as that illustrated in Fig. 9 etc., and not so long as that illustrated in the figures first discussed. Just as in the other arrangements, which have been described, it will be seen from a consideration of these figures, 13 and following, that each belt raising roller moves its own individual batch of produce down the belt; the number and spacings of the belt raising rollers simply determining the number of produce batches which are carried by any given belt at any one time.

Figure 4:
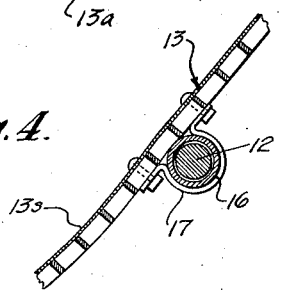
Fig. 4 is a detail section taken as indicated by line 4—4 of Fig. 2.

The element which we herein call the belt, may be of any nature and composed of any suitable material, or materials. In the detail of Fig. 4, we show the belt as if it were composed of a flexible metal mesh, such as the mesh of which common floor mats are made. This metal mesh may be, if desired, surfaced with a flexible sheet 13s of any suitable flexible material, such as ordinary belting or the like; or the whole belt structure may be made of any such suitable flexible sheet or strip, such as belting. The surface of such flexible material may be as desired; smooth, rough, abrasive, or for instance in the form of a brush (e. g., a heavily napped or fibrous material) that will brush the produce as it moves on the belt.

Fig. 1 shows the belt 13 merely diagrammatically. Fig. 2 shows it as if it were either made entirely of such a material as flexible belting, or made of a metal mesh with a flexible belting surface. As indicated in Fig. 2, any such belt material should preferably be perforated, as indicated at 13p, so that the bath liquids may pass through the belt, and the belt thus easily be raised and lowered in the bath without the liquid having to run off and enter at the sides of the belt.

To prevent produce from working off the edges of the belt, and either dropping into the bath or becoming entangled in the chain mechanism, we provide suitable guards. It will be noted that the rollers 18 are mounted on shafts or trunnions 40 which are of relatively small diameter. See Fig. 2. These shafts or trunnions are mounted upon and carried by the chains 25; and for simplicity's sake, it is preferred that the rollers 18 rotate upon shafts 40 rather than that these shafts, as trunnions, should rotate in bearings carried by the chains 25. In the preferred arrangement, the shafts 40 may extend unbroken from one chain to the other, the rollers mounted to rotate upon them, and the shafts be rigidly affixed in any simple manner to the chains.

We provide, at each side of the belt, an upper guard plate 41, and a lower guard plate 42. The two lower guard plates may be mounted on suitable brackets 43, and the upper guard plates by suitable brackets 44. The lower edge of the lower plate 42 is somewhat below the lowest level reached by the belt sags 13a, as shown at 42a. The upper edge of upper guard plate 41, as shown at 41a, is above the highest level reached by the belt or the produce thereon, when it is raised to its uppermost position. The lower edge 41b of the upper guard plate 41 is of a shape corresponding to the path of the chains 25 and the paths of the roller shafts 40; and as also is the upper edge 42b of the lower guard plate 42. These two edges 41b and 42b are spaced substantially just far enough apart to allow the roller shafts 40 to travel in the resulting slot between them. The slot is so narrow as to preclude the liability of any produce moving or protruding through it.

It will be readily understood that spraying devices could be installed over the whole length of the belt and spray continuously, and that in such case the produce would be subjected to the spraying action whenever the produce is lifted out of the water bath. However, in that case, spraying which takes place at the times when the produce is in the water bath, and which takes place at the locations other than the locations of the produce when lifted from the water bath, would be practically ineffectual and wasted. We consequently prefer to provide the sprays at the effectual positions only, and then so to time them that they operate only when the produce is lifted out of the bath.

Thus, in Fig. 1, we show sets of spray pipes 60 and nozzles located one set above each section of the belt whereon the produce rests while it is above the water bath. The positioning, and extent of these spraying sections in Fig. 1 will be readily understood from a consideration of the diagrams of Figs. 5 to 8. For any one sag section of the belt, the produce P is lifted out of the water only within a zone such as is indicated between the dotted lines L and L₁ in Fig. 8. Spraying sections 50 of Fig. 1 are located approximately in such position as to deliver spray to such zones.

Moreover, these spraying sections are valvularly controlled so as to deliver spray only at the times when batches of produce are lifted above the water baths. In the form of Fig. 1, the produce batches are lifted from only alternate belt sags at one time. In the spraying arrangement of Fig. 1, alternate spray sets 50 are connected, respectively, to the two water distribution pipes 51 and 52 which are fed from a timer valve 53, supplied with water by supply pipe 54. This timer valve may be driven by any suitable connection with the other parts of the mechanism; it is shown, diagrammatically, as being driven from the idler shaft 55 which carries one of the chain sprockets 56; via the chain or belt drive 57 to the valve shaft 58. The valve plug 59, illustrated as rotating counter-clockwise, has, in the position of Fig. 1, just cut off the supply of water from spray sets 50a, which are located above those portions of the belt from which, in the position of Fig. 1, the produce has just been discharged into the next adjacent sag of the belt. And the valve 59 is so timed that when the belt raising rollers reach about such a position as is diagrammatically illustrated in Fig. 8, under the spray sets 50b, then those spray sets will be supplied with water until about the time that the rollers have reached the relative position shown in Fig. 5, when the produce batches are next discharged into the water bath.

Figs. 16 to 19 diagrammatically illustrate another modification. Here we show how the rollers may engage the belt sags on their back travel; so that each charge of produce in each sag is subjected to another agitation, in addition to the agitation it receives when dumped into the sag. By way of illustration we show this arrangement applied to the roller spacing that has been illustrated in Figs. 1 to 8.

In Figs. 16 to 19 the belt 13 is shown, as it is in Figs. 5 etc., and the same numerals are applied. The upper run or path of the chain and rollers, shown by line 25a, is the same as in Figs. 5, etc.; and the roller positions, in their upper run, are substantially the same in Figs. 16 to 19 as they are in Figs. 5 to 8, respectively. It will thus be unnecessary to repeat the description of those successive positions.

Figure 16:
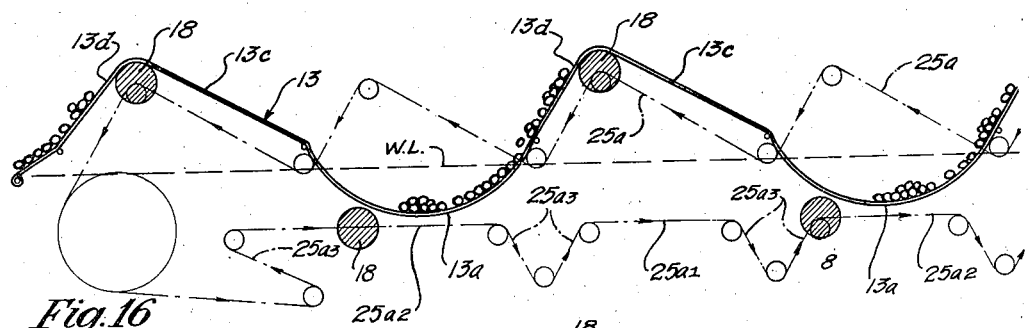
Figure 17:
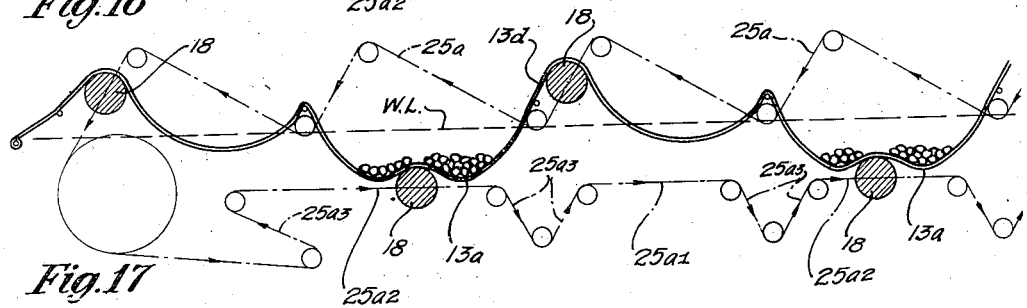
Figure 18:
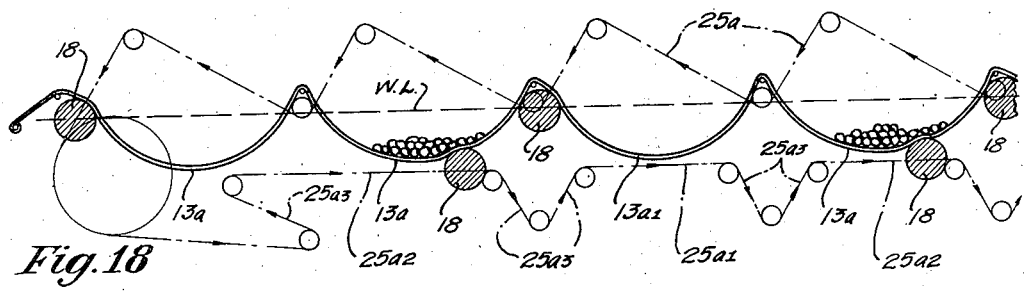

The lower, return, run of the chains is, in these figures, modified so that a roller 18 travels under each belt sag 13a, lifting the sag and disturbing its charge. Fig. 16 shows two sags just receiving their charges of produce. Rollers 18, on their return run below the belt, are just about to contact these sags. In Fig. 17, these rollers, moving from the left toward the right, are lifting the sags and disturbing the produce while it soaks in the water bath. In Fig. 18 these rollers have just passed the sags; and the upper rollers 18 are then in their positions just ready to lift these charged sags and deliver the produce to the next sags, toward the left. The beginning of that section is indicated in Fig. 19.

Figure 19:
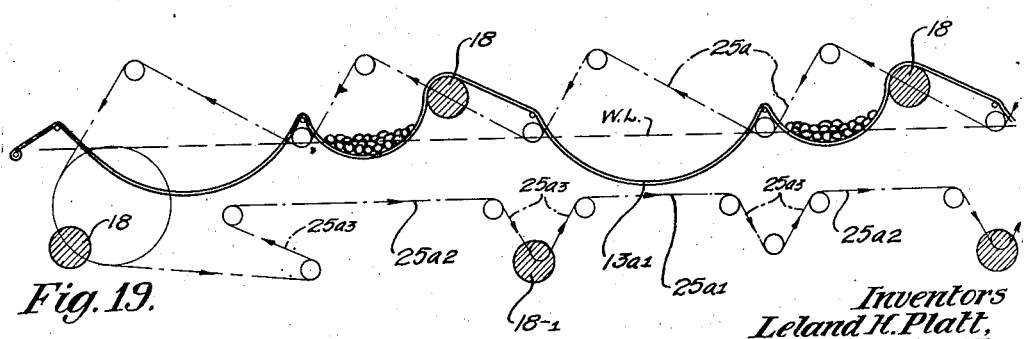

As has been before described, further movement of the upper rollers causes the charges to be delivered into the next succeeding sags; e. g., into the sags indicated as $13a_1$, in Figs. 18 and 19 (the sags from which the charges are being removed in Fig. 16). Immediately this occurs the roller which is particularly designated $18-1$ in Fig. 19 will be ready to travel the run designated particularly $25a_1$ and to raise and disturb the sag $13a_1$ just as it has previously disturbed sag $13a$. From what has been said, it will readily be seen that the produce is subjected to several successive and different disturbances during each cycle of operation. First it is disturbed as it is dumped into a sag and enters the water bath, in movement toward the left. Then it is disturbed by the rightwardly moving lower roller, being more or less moved toward the right during that disturbance. Then finally it is again disturbed as it is lifted out of the water bath, again being moved toward the left. The additional disturbance provided by the rollers in their lower run adds to the machine's effectiveness in loosening and removing closely adhering earth and in thoroughly washing the produce.

To accomplish these disturbances by the lower run rollers, the lower chain runs are designed so as to properly place the lower run rollers. Under each sag portion of the belt the chain path has horizontal, elevated runs $25a_2$ and $25a_1$. These runs are at such elevation as to cause the rollers to contact and locally lift the sags in the amount desired. Between the successive runs $25a_2$, $25a_1$, etc. the chain is shown as taken up in loops $25a_3$, so as to take care of the length of chain that is necessary between successive rollers 18 to obtain the proper roller spacings during their upper runs.

This arrangement times the actions of the rollers in their lower run so that each belt sag is contacted and disturbed each time it hangs down with a charge in it. However, as will be readily recognized, the chain loops $25a_1$ and $25a_2$ could be dispensed with, and the rollers in that case would move along their elevated lower run still striking at least some of the sags as they come into contact with them, without the necessity of being accurately timed.

Regarding the water bath, it will be understood without detailed description that any desired arrangement may be utilized for keeping it at constant level and for changing or circulating the water, and removing the dirt, etc. that has been washed off the produce.

We claim:

1. In mechanism of the class described, a horizontally extending produce supporting belt anchored against substantial longitudinal movement at points spaced longitudinally along its length and between its ends and normally sagging between adjacent anchor points, a movable belt raising element, and means for moving the said element longitudinally under the belt from end to end, said means acting to move said element in a path below the belt at each anchor point and to raise said element while travelling longitudinally between adjacent anchor points.

2. In mechanism of the class described, a horizontally extending produce supporting belt anchored against substantial longitudinal movement at points spaced longitudinally along its length and between its ends and normally sagging between adjacent anchor points, a pair of endless carrier chains one at each side of the belt and travelling longitudinally thereof from end to end, a plurality of longitudinally spaced belt raising elements extending transversely under the belt and carried by said chains, the paths of said carrier chains being such that the belt raising elements are moved longitudinally below the belt at each anchor point and are moved upwardly during their longitudinal movements between adjacent anchor points.

LELAND H. PLATT.
LELAND H. PLATT, Jr.